Patented Jan. 13, 1942

2,269,828

UNITED STATES PATENT OFFICE 2,269,828

FIELD FORAGE CUTTER

George E. Michel, Ralph G. Michel, and Floyd B. Emmons, Marion, Iowa

Application August 7, 1939, Serial No. 288,714

6 Claims. (Cl. 56—16)

This invention relates to field forage harvesting means and has particular relation to a device to be partially controlled from and to be driven by power supplied from a tractor for mowing forage crops and immediately cutting the crop up into ensilage ready to be placed in a silo or other storage place.

It is important, in harvesting forage crops, that they be harvested, handled, and put up quickly and with a minimum of labor. This is particularly so when these forage crops are to be stored in a silo or the like, and a delay in the filling of the silo may result in considerable spoilage. Furthermore, the hand labor required should be reduced to a minimum because labor is not readily available during the harvesting season.

It is, therefore, one of the main objects of our invention to materially speed up the harvesting and storage of forage crops and to reduce to a minimum the hand labor required.

It is another object of our invention to provide a unitary structure suitable for mowing a forage crop and immediately transforming it into ensilage.

Another object of our invention is to provide such a unitary structure as may be readily towed by an ordinary tractor and which is so constructed that it may readily be supplied with the power necessary to operate it from the power take-off of the tractor used to pull the device.

Another object of our invention is to provide a combination device so arranged as to permit it to be adapted to a variety of conditions and to permit it to be easily and efficiently operated so as to require a minimum of labor.

It is a further object of our invention to provide a simple and positive mechanism for driving the various parts of such a device.

It is a still further object of our invention to provide means for preventing clogging of the feeding mechanism.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

Figure 1:
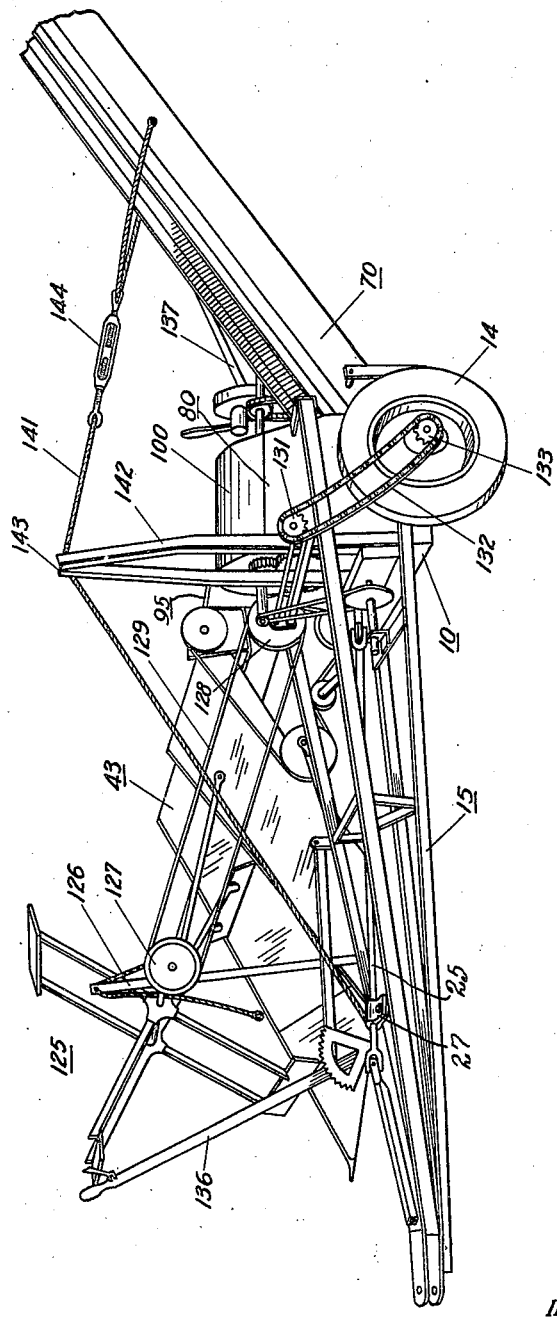
Figure 1 is a side view in perspective illustrating a device constructed in accordance with one embodiment of our invention.

Referring now to the drawings:

The device shown in Figure 1 comprises, in general, a framework 10, a sickle type cutter and elevating means indicated generally at 43, a feeder table 95, a feeder and cutter mechanism shown at 80, and an elevating structure 70.

Figure 2:
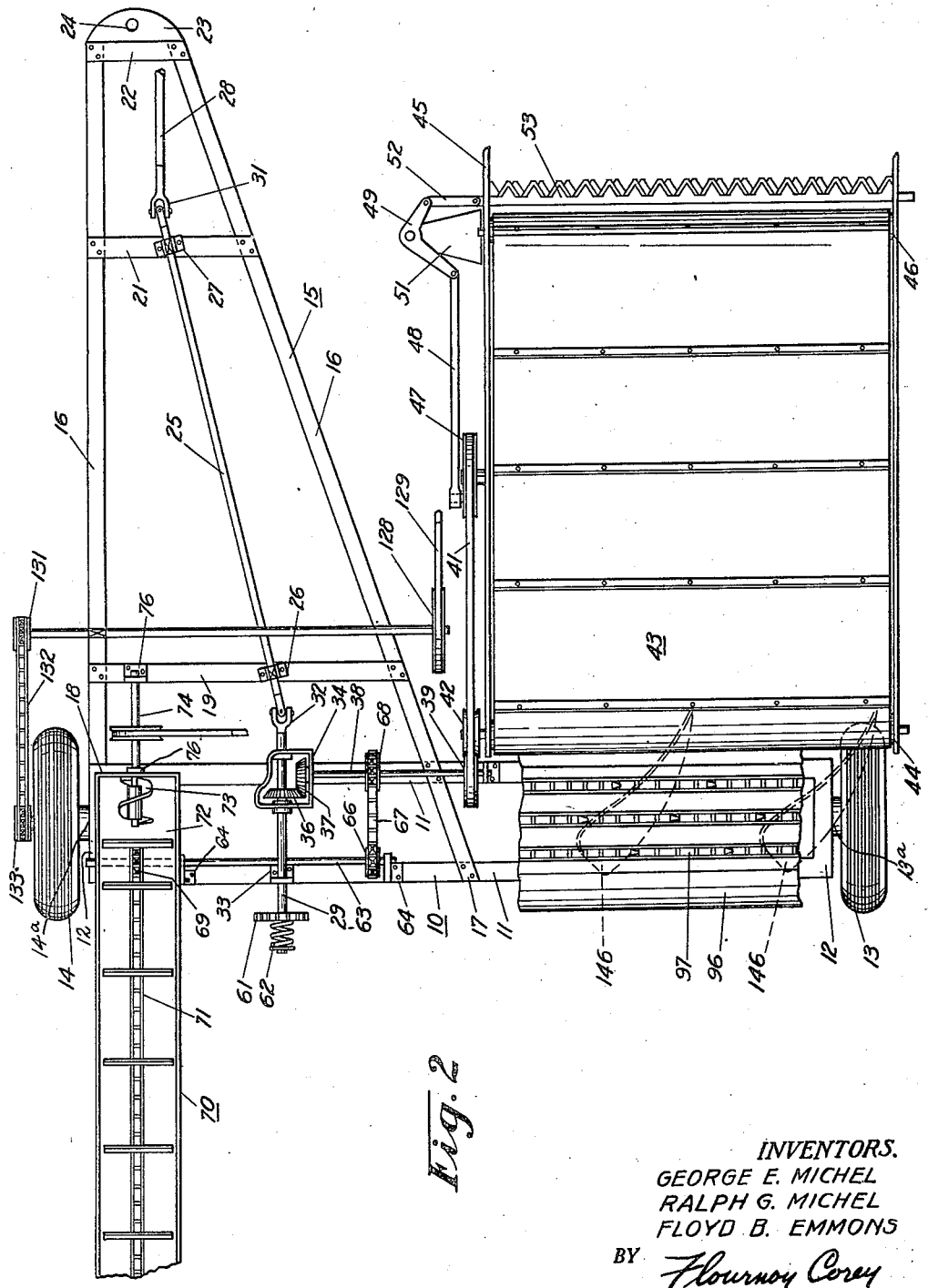
Figure 2 is a plan view of a portion of the device illustrating in particular the framework, a part of the driving mechanism, and the means for preventing clogging of the feeding and elevating devices.
Figure 3:
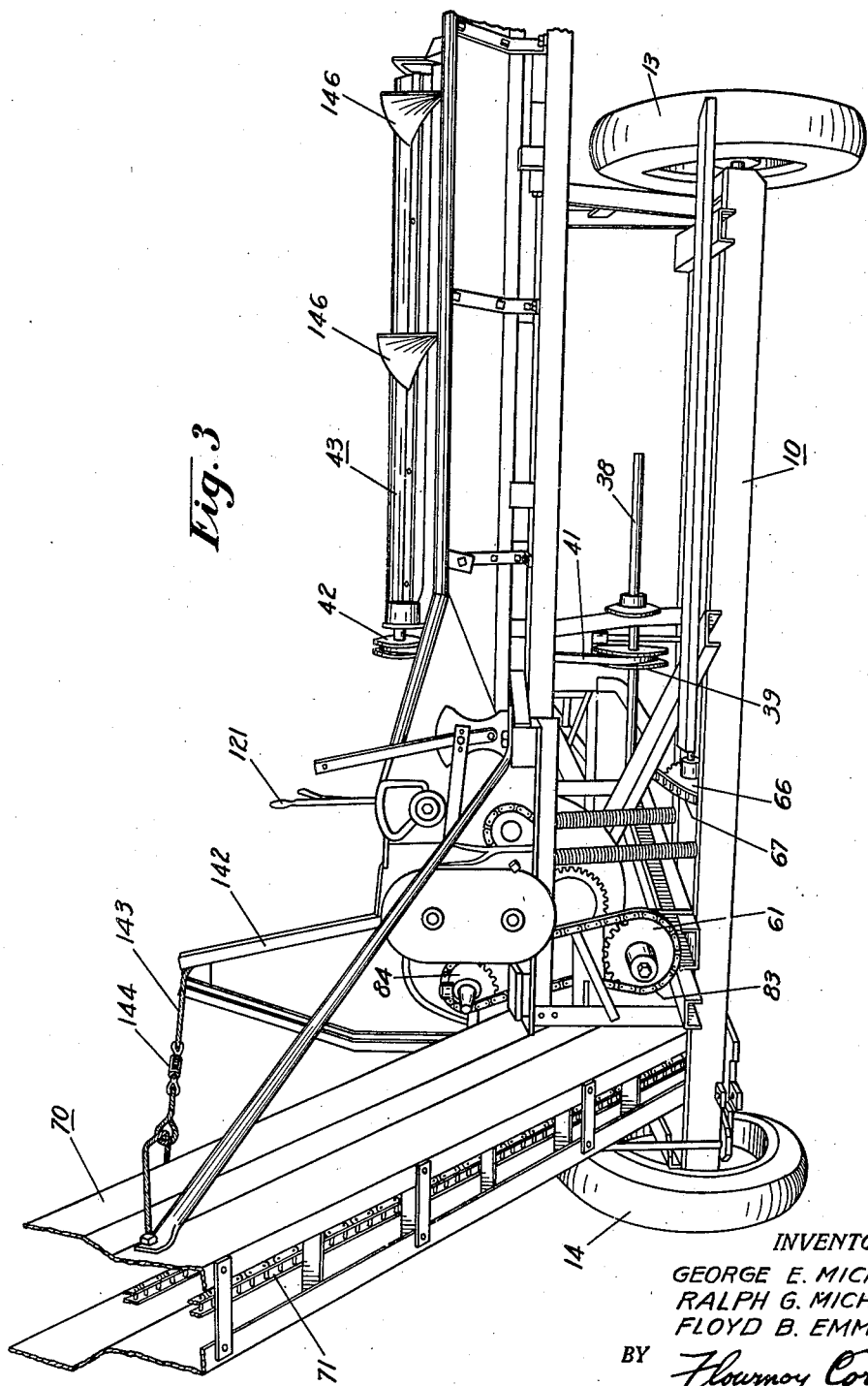
Figure 3 is a view in elevation of the rear of the structure shown in Figure 1.

Referring now to Figure 2 in connection with Figure 1; the entire structure is mounted upon a framework 10 which is preferably in the form of a plurality of cross members 11 joined together at the ends by members 12 to which spindles 13a and 14a are attached for mounting wheels 13 and 14. These spindles may be attached to the members 12 by welding, bolting or in any other conventional manner.

A tongue or draw bar in the form of a triangular shaped frame preferably extends forwardly from the main frame, as shown generally at 15. This triangular shaped frame is used to support a part of the operating mechanism and is also used as a tongue with which to tow the entire device. This tongue preferably includes a plurality of angle iron or other structural type of members 16 attached to the frame 10, as at 17 and 18. The members 16 are joined together by one or more cross ties and mounting strips as 19 and 21 and 22. The forward ends of the members 16 are also joined together by a pair of plates 23 having aligned holes therethrough, as shown at 24, to permit attaching to the tow pin of a tractor.

A power shaft 25 is mounted on the tongue 15 in bearings 26 and 27 to transmit power from the tractor to the various mechanisms on the forage cutter. The power shaft includes auxiliary shafts 28 and 29 connected to the main shaft by universal joints 31 and 32. The portion 28 of the drive or power shaft is preferably splined or squared and furnished with a matching member adapted to slide on the splined portion (not shown). This last mentioned member is attached to the power take-off of the tractor. This may be done in any conventional manner.

The rear member of the power shaft or auxiliary shaft 29 is preferably mounted in one or more brackets, such as indicated at 33, and also journaled in a gear box 34 in which a bevel gear 36 on the power shaft serves to drive a companion bevel gear 37 to drive a cross shaft 38. A V pulley 39 mounted upon this shaft 38 serves to operate the V belt 41, the pulley 42 and the endless belt or conveyor 43. This conveyor belt is mounted upon rollers 44 and 46 at the upper and lower ends of the sickle mechanism frame 45, all in accordance with the usual practice.

The belt 41 also serves to drive a crank pulley 47 to which the pitman 48 is connected. The lower end of the pitman reciprocates one arm of a bell crank 49 which is mounted upon a framework 51 supported from the side of the sickle framework 45. The other arm of the bell crank is pivotally connected, by means of a link 52, to the sickle knives 53.

A sprocket wheel 61 is mounted upon the rear end of the rear power shaft 29 and is affixed to the power shaft by means of a slip clutch 62. The feed table, feed rolls, and cutter knives, to be driven through the sprocket 61, will be described in greater detail hereinafter.

A rear cross shaft 63, mounted in brackets as indicated at 64, is adapted to be driven through sprocket 66 mounted on the rear cross shaft, a chain 67, and a sprocket 68 mounted on the forward cross shaft 38. The rear cross shaft 63 serves to rotate a sprocket 69 and thereby operate a chain conveyor 71 in the ensilage elevator 70. This ensilage elevator extends rearwardly and upwardly from the main frame 10 of the device to which it is attached. The lower end of the elevator includes a hopper portion 72 into which the ensilage is fed after being cut up by the rotary cutter knives.

A feed worm 73 is mounted on a shaft 74 in the lower portion of the hopper for rotation in brackets or bearings 76, one of which may be affixed to the lower end of the ensilage elevator hopper 72. The feed worm 73 serves to prevent clogging in the bottom of the hopper by constantly feeding the ensilage toward the lower end of the elevator 71.

Figure 4:
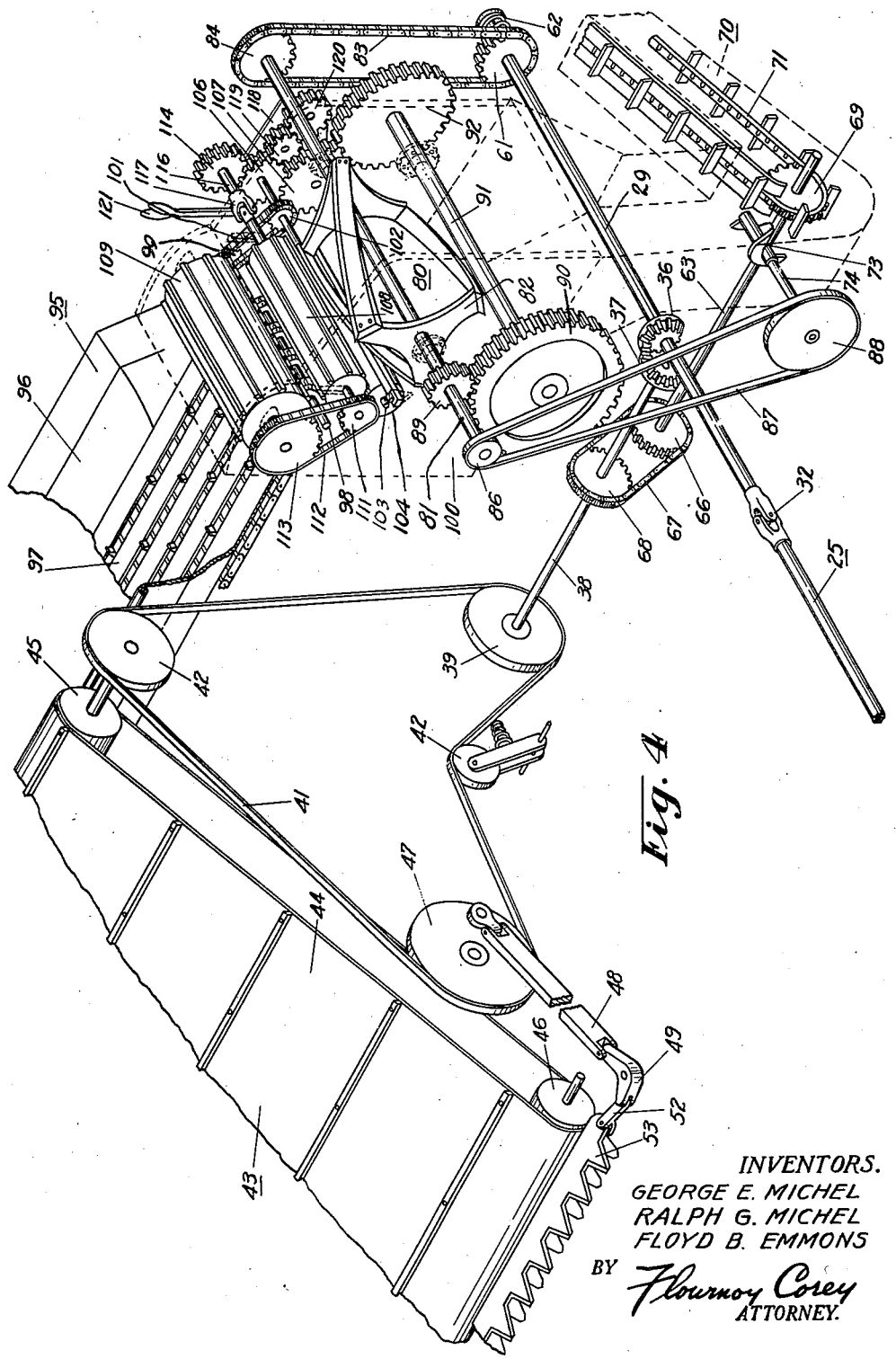
Figure 4 is a schematic view in perspective illustrating the driving mechanism and showing the relationship of the more important parts of the structure.

The details of the feeding and cutting and driving mechanism, as well as the relationship of the various parts, is most clearly illustrated in Figure 4. A shaft 81, having the cutter blades and blade supporting structure 82 mounted thereon, is mounted for rotation above and substantially parallel to the rear power shaft 29. This cutter shaft is driven from the rear power shaft through the agency of the sprocket wheel 61, chain drive 83, and the sprocket wheel 84 mounted on the cutter shaft.

A small V pulley 86 mounted on the forward end of the cutter shaft, through the agency of a V belt 87, drives another larger V pulley 88 mounted upon the shaft 74 supporting the ensilage feeding worm 73.

A small pinion 89, also mounted upon the cutter shaft, drives a large gear wheel 90 which is mounted on a shaft 91. A cross feed table, indicated generally at 95, serves to feed clover or other material, deposited thereon by the sickle conveyor 43, into the feeder rollers and the cutter knives.

The feeder table comprises in general a trough shaped member 96 positioned to the rear of and preferably slightly below the upper end of the sickle elevator belt. A plurality of conveyor chain members, as shown at 97, are located in the bottom portion of this trough. These conveyor chains extend over sprockets mounted on shafts below each end of the feeder table. The shaft 98, upon which these sprockets are mounted at the end of the table nearest the cutter knives, is arranged to be rotated by means of a sprocket 99 mounted upon the end of the shaft 98, a chain 101 and a sprocket 102. This sprocket 102 is mounted for rotation with a cross shaft 103 upon which is mounted a lower small feed roll 104. A spur gear 106 for driving this lower feed roll shaft is fixedly mounted thereon. An idler gear 107 transmits power to this lower feed roll from a large gear 92, which gear is mounted upon the speed reduction shaft 91 which is driven by the cutter shaft.

A small and a large feed roller, 108 and 109 respectively, are mounted for rotation above the lower feed roller and the sprockets driving the cross feed table conveyor chains. The feed rolls and rotary cutting knife are of course enclosed within a casing, as shown at 100 in Figure 1.

These feed rollers are mounted in such a manner as to permit varying quantities of material to be passed between them and the lower feed rolls. They are arranged to be biased toward the lower feed rolls by means of springs (not shown). The large feed roll is driven by the small feed roll at a proportionate rate of speed through sprockets 111 and 113 and chain 112. The small feed roll is driven by means of a toothed gear 114 mounted upon the roll shaft 116 and engaged with the spur gear 106 which drives the lower feed roll. The shaft 116 connecting the toothed gear 114 and the upper small feed roll is arranged with one or more knuckle or universal joints, indicated generally at 117, to permit the upper feed rolls to rise and fall as required by the amount of material being fed therethrough, without interfering with the proper engagement of the driving gears.

The idler gear 107 is mounted upon a pivoted plate 118. This plate may be moved by means of a control handle 121 to engage or disengage the idler with its driver gear as desired so as to permit the operator to stop the feed table and feeder rolls if they become clogged. A pair of reverse idler gears 119 and 120 are also mounted upon this plate and may be engaged, when desired, between the driving gear 92 and the lower feed roll gear 106.

The slip clutch 62 mounted upon the rear power shaft acts only in the case of an overload in the machine and thus helps to prevent damage due to such overloading.

In accord with common practice, I have provided a paddle type of sickle feeder, as indicated generally at 125, for feeding the forage crop against the blades of the sickle. This feeder or beater is supported for rotation by means of a post 126 attached at its lower end to the framework of the sickle structure and is driven by means of pulleys 127 and 128, a V belt 129, a sprocket 131 which is mounted for rotation with the pulley 128, a chain drive 132 and a sprocket 133 arranged to drive the chain from the wheel 14. This arrangement permits the feeder or beater wheel to be driven at a rate of speed in direct proportion to the rate of speed at which the vehicle is traveling over the ground.

An operating handle 136 mounted upon the side of the tongue is connected by means of a series of levers and lever arms to the lower end of the sickle supporting framework. This mechanism permits the height of the sickle above the ground to be regulated as desired.

The rear ensilage elevator is supported at its lower end, as stated before, on the main framework 10. It is braced against side motion by means of a brace 137. A pair of strap members 138 are attached to and extend to the rear of the main frame 10 at a point directly below the ensilage elevator. These strap members have aligned openings through their outer ends to receive a pin 139. The tongue of a wagon may be hitched to this member by means of the pin and may be drawn along the forage cutter as it is being used in the field to receive the ensilage discharged from the upper end of the elevator.

In order to rigidly support the ensilage elevator and hold it in its proper position; that is, at the proper height, we have provided a cable or guy rod 141 which extends from the ensilage elevator to a point on the structure near the forward end of the tongue. A pair of struts 142 are attached at their lower ends to the main framework of the harvesting machine and support the cable near its midpoint as at 143. A turn-buckle 144 may be provided to vary the height of the elevator above the ground.

In order to prevent clogging of the feeder table we prefer to provide one or more deflector vanes, as shown at 146. These are preferably of sheet metal, curved as shown, and supported from the feeder table. They serve to direct the upper portion of the material being fed into the trough by the sickle elevator toward the feeder rolls; that is, they tend to straighten out the stems of the crop so as to lie parallel with the feeder table to permit them to feed directly into the feeder rolls and cutter and thus prevent clogging.

It is one of the features of our invention that forage is cut by the sickle, carried rearwardly by the forage elevator, then transversely by the feeder elevator, and that the forage is then cut by the cutter and discharged into the delivery elevator which conveys it rearwardly to the waiting wagon. In providing for transverse movement of the cut forage we are enabled to secure ample clearance for the wagons.

We have provided a structure which will permit speedy and efficient harvesting of forage crops and making them into ensilage with a minimum of hand labor and at a minimum of expense. The operation of converting a standing forage crop into ensilage is tremendously speeded up.

Although we have described a specific embodiment of our invention, it is apparent that modifications thereof may be made by those skilled in the art. Such modifications may be made without departing from the spirit and scope of our invention as set forth in the appended claims.

We claim as our invention:

1. In a grass crop harvester and ensilage cutter, the combination, a sickle cutter means, a grass elevator, a feeder table, a plurality of feeder rolls, a rotary ensilage cutter, a hopper located below the ensilage cutter, an ensilage elevator leading from the hopper, a framework having supporting wheels for mounting all of the aforementioned members, a tongue extending forwardly from the frame at one side of the center thereof, the sickle cutter means extending forwardly from the other side of the frame means for driving the sickle, the sickle elevator, the feed table, feeder rolls, rotary cutter and ensilage elevator from a single power shaft, said power shaft extending longitudinally of the tongue and adapted to be driven from the power take-off of a tractor or the like used for towing the field forage cutter, the ensilage elevator machine extending rearwardly from the frame, and means for coupling a wagon to the frame directly to the rear of the tongue and below the ensilage elevator.

2. In a grass crop harvester, the combination of a framework, wheels mounted thereon, a substantially triangular shaped tongue extending forwardly from one side thereof, the forward end of said tongue adapted to be connected to and drawn by a tractor vehicle, a power shaft extending rearwardly along the tongue and adapted to be operatively connected with a power take-off on the tractor, a sickle type grass cutter and grass elevator means extending forwardly from the frame, the upper end of the forage elevator discharging onto a feeder table, said table extending laterally of the frame means positioned above feeder table for re-directing grass fed from the said elevator means to cause it to lie parallel to the line of motion of the feeder table, a plurality of feeder rolls, a rotary cutter and cutter bar adapted to cut into ensilage the grass fed into it by the feeder table and feeder rolls, a hopper below the rotary cutter for receiving the ensilage, an ensilage elevator extending rearwardly and upwardly from a hopper, means comprising a worm feeding toward the ensilage elevator for preventing clogging in the hopper, transmission means for driving the sickle, the forage elevator, the feeder table, the feeder rolls, rotary cutter and ensilage elevator from the power shaft, and means for preventing damage from overload of the feeder rolls and rotary cutter.

3. In a device of the character described having a rectangular main frame, supporting wheels, a sickle, an apron elevator, a feed table, a plurality of feed rolls, a rotary cutter and an ensilage elevator, means for driving the various members including a main drive shaft, a cross shaft driven therefrom, means for driving the sickle, the apron elevator and the ensilage elevator from the cross shaft, an overload release means operatively connected with the main drive shaft, and means for driving the rotary cutter, the feed rolls and the feed table all at consecutively reduced speeds from the overload release means.

4. In a device of the character described having a rectangular main frame, supporting wheels at each end thereof, a tongue extending forwardly from one end of the frame, a sickle, and an apron elevator extending forwardly from the other end of the frame, a feed table, a plurality of feed rolls, a rotary cutter, an ensilage elevator, a paddle type feeder for the sickle, means for driving the various members from a power vehicle, said means including a main drive shaft extending along the tongue, a cross shaft on the main frame driven from the main drive shaft, means for driving the sickle, the apron elevator and the ensilage elevator from the cross shaft, an overload release means operatively connected with the main drive shaft, means for driving the rotary cutter, the feed rolls and the feed table, all at consecutively reduced speeds, through the overload release means, and means operatively connected with the frame supporting wheel adjacent the tongue for driving the sickle feeder at a rate of speed in proportion to the speed at which the frame is drawn over the ground by the power vehicle.

5. In a device of the character described having a rectangular main frame, supporting wheels, a sickle, an apron elevator, a feed table, a plurality of feed rolls, a rotary cutter and an ensilage elevator, means for driving the various members including a main drive shaft, a cross shaft driven therefrom, means for driving the sickle, the apron elevator and the ensilage elevator from the cross shaft, an overload release means operatively connected with the main drive shaft, and means for driving the rotary cutter, the feed rolls and the feed table all at consecutively reduced speeds from the overload release means, the means for driving the cutter feed rolls and the feed table including alternative trains of drive gearing, one of said trains of gearing adapted to be manually engageable to drive the feed rolls and feed table in reverse direction to remove any clogging material, whereby clogging of the feed rolls or cutter may slow down or stop said feed rolls or cutter without affecting the operation of the sickle, the apron elevator, or the ensilage elevator.

6. In a grass crop harvesting device including an ensilage cutting means and an ensilage discharge elevator, a hopper for receiving ensilage from the cutting means, the said discharge elevator extending into said hopper, and a worm feeder disposed in the hopper above the lower end of the elevator and adapted to feed ensilage against the lifting side of the elevator, and means for driving the elevator and the worm feeder at proportionate rates of speed.

GEORGE E. MICHEL.
RALPH G. MICHEL.
FLOYD B. EMMONS.